United States Patent Office 3,567,739
Patented Mar. 2, 1971

3,567,739
PRODUCTION OF PURIFIED TETRABROMO-
PHTHALIC ANHYDRIDE
Joseph Eugene Sanger, St. Louis, Mich., assignor to
Michigan Chemical Corporation, St. Louis, Mich.
No Drawing. Filed Oct. 4, 1968, Ser. No. 765,021
Int. Cl. C07c 63/18
U.S. Cl. 260—346.3                              6 Claims

ABSTRACT OF THE DISCLOSURE

Tetrabromophthalic anhydride which had been produced in an acid medium such as oleum, is treated with dioxane to remove all of the residual acid, is washed with water and dried, preferably in an oven at about 110° C. The crystals are washed with the dioxane, not dissolved and recrystallized.

The present invention relates to an improved process for producing purified brominated phthalic anhydride, relating more particularly to a process for producing Tetrabromophthalic anhydride which had been produced from contamination by sulfuric acid.

The bromination of phthalic anhydride to produce tetrabromophthalic anhydride is normally carried out in oleum; that is, concentrated sulfuric acid containing some quantity of $SO_3$. According to one of the better known processes, the phthalic anhydride is dissolved in sulfuric acid containing about 50% $SO_3$. The bromine is then added and the temperature of the reaction mixture is thereafter raised to about 200° C. This process is of course, very corrosive. It has been suggested that the process should be carried out step wise at lower temperatures. This procedure is not only cumbersome, but is wasteful of heat inasmuch as the reaction mixture must be cooled at each step and then reheated. Both of these processes have the further disadvantage of requiring a considerable excess of bromine (2 to 4 times the theoretical quantity) to enable the production of satisfactory yields of tetrabromophthalic anhydride.

According to a more recent process, some of the difficulties mentioned above are lessened by carrying out the bromination of the phthalic anhydride in concentrated sulfuric acid having a 25–35% $SO_3$ content at temperatures of about 60–70° C. while utilizing a small amount of $I_2$ as a catalyst. It is true that this process requires a large excess of $SO_3$, but it requires only a relatively small excess (about 15% over the theoretical amount) of bromine and it can be conducted at atmospheric pressure. Thus the corrosiveness of the reaction mixture with respect to the reaction vessel and other equipment is appreciably lessened and the many difficulties encountered at higher pressure in a large scale reaction are avoided. But this process although producing satisfactory yields of tetrabromophthalic anhydride more conveniently than the prior processes did, possesses at least one inherent disadvantage. The tetrabromophthalic anhydride produced by this process contains, for most runs, at least 0.30% and often as much as 0.45% by weight or more of sulfuric acid. Apparently this sulfuric acid is occluded on or within the crystal structure of the tetrabromophthalic anhydride. Such residual acid is most undesirable, and is especially so when the tetrabromophthalic anhydride is used to make fire retardant or self-extinguishing polyester resins. This is the principal use of this material although it has some other uses. For example, it has been used in the production of plasticizers and adhesives where flame retardation is of importance.

It has been recognized that the chemical incorporation of bromine into a polyester resin should result in a cured polymer which is not only fire retardant but which should have self-extinguishing properties. However, in practice contrary to expectation, it was found that a satisfactory cured polyester could not be produced from tetrabromophthalic anhydride. The polyester resin so produced suffered from premature gelation occurring near the end of the polymerization reaction or shortly after the introduction of styrene to the base resin. As a result the reaction either set up so quickly as to produce no suitable polymer, or the cured polymer had very poor physical properties. It was found that the di- or polyhydric alcohol had been cyclized to produce a cyclic ether, thereby making it unavailable for reaction with the phthalic anhydride. Unexpectedly, when the tetrabromophthalic was subjected to a purification procedure which removed substantially all of the residual acidity, it would react with the polyhydric alcohol in the same way as other di-acids did. Presumably the cyclic ethers did not form without the acid. The resulting polyester resins were satisfactory and, if the proper quantity of tetrabromophthalic anhydride were used, they were self-extinguishing—see U.S. Pat. 3,285,995. It would, of course, be helpful if tetrabromophthalic anhydride free from residual acidity were commercially available; but such is not the case. Thus some practical but effective purification process is needed.

One well known procedure for the purification of tetrabromophthalic anhydride involves recrystallizing it from xylene—Pratt and Young, Journal of the American Chemical Society, vol. 40, p. 1416. This resulted in a product having a melting point of 274–275° C. (pure tetrabromophthalic anhydride 279–280.5° C.) which was little better than the starting material, and it did not remove the residual acidity. The preferred laboratory procedure for the purification of technical grade tetrabromophthalic anhydride is to dissolve it in dilute sodium hydroxide until all of the solids dissolve. If any solids remain after long digestion, they are filtered out, The filtrate is then treated with dilute hydrochloric acid which precipitates tetrabromophthalic acid. The precipitate is filtered, slurried with hot water and filtered again, these steps being repeated several times to remove the sodium chloride formed in the reaction. The tetrabromophthalic acid is then heated for several hours at about 150% C. in an oven to convert the tetrabromophthalic acid to tetrabromophthalic anhydride. The product resulting from this purification procedure is substantially pure tetrabromophthalic anhydride free from residual acid, but of course this process is long, involved and difficult. It is wholly impracticable from the commercial point of view.

Accordingly, in order to use commercially available tetrabromophthalic anhydride for the production of polyesters, it has been necessary to add with the tetrabromophthalic anhydride various amounts of a neutralizing agent for the residual acid such for example as sodium acetate. Not only must this neutralizing agent be added to the "cook" for producing the polyester, but it must be added in the right amount. This amount differs with each batch of tetrabromophthalic anhydride and a single "cook" may involve several different batches. This, of course, causes complications. Efforts to use more of the neutralizing agent than theoretically required in order to play safe have not always solved this problem, since too much sodium acetate causes dark resins. And, of course, introducing more neutralizing agent into the polyester resin is undesirable for other reasons. For one thing, these neutralizing agents cause a precipitate to form which seems to be the salt resulting from the neutralizing reaction, such as sodium sulphate. This salt causes haziness in the resin, and if a real clear resin is desired, a hard pressure filtering operation is required. This operation is difficult and adds to the expense of the resin.

In view of these difficulties, attempts have been made to remove the residual acidity from the technical grade tetrabromophthalic anhydride by recrystallizing, washing, or recrystallization followed by washing. But these treatments have not been successful heretofore, although a number of materials have been tried. Tetrabromophthalic anhydride reacts slowly on heating with alcohol to form an alcohol soluble half ester. It is soluble in dimethylformamide and nitrobenzene. It is slightly soluble in xylene, dioxane, ketones, chlorinated solvents and acetic acid. It appears to be insoluble in aliphatic hydrocarbons, at least any of those which are generally available. Efforts to recrystallize this material from what appeared to be the more promising of these solvents have been made. In fact, xylene did not produce satisfactory results at all. These recrystallizing procedures also resulted in appreciable loss of yield, and large quantities of solvent were required which had to be recovered. Two solvent systems were also tried but merely complicated the matter, since the results were not appreciably better and both solvents had to be recovered.

Since technical grade tetrabromophthalic anhydride is crystalline, a washing procedure would seem to be indicated. However, washing with a variety of materials including repeated washing operations did not produce satisfactory results. In Table I a commercial batch was washed with the materials shown in the table. This particular lot possessed 0.423% by weight of residual sulfuric acid, as produced.

TABLE I

| Material used for washing: | Residual $H_2SO_4$ after washing |
|---|---|
| $H_2O$ | 0.340 |
| $N_2HCO_3$ | 0.340 |
| Hot $H_2O$ (90° C.) | 0.318 |
| 10% MeOH (in $H_2O$) | 0.330 |
| 5% Dioxane (in $H_2O$) | 0.325 |
| Benzene | 0.457 |
| Formalin (40% $CH_2O$) | 0.346 |
| Tetrahydrofuran | 0.306 |
| 10% Trioxane (in $H_2O$) | 0.335 |
| 10% Trioxane (in benzene) | 0.457 |

Apparently benzene causes some loss of the tetrabromophthalic anhydride thus concentrating the acid a bit and providing a seeming increase in acid content. Aqueous $Na_2CO_3$ and $NH_3$ were not successful for removing $H_2SO_4$, since they appear to react slowly with the tetrabromophthalic anhydride.

In order to meet present commercial specifications, technical grade tetrabromophthalic anhydride cannot have more than 0.30% residual acid (as $H_2SO_4$), and many users request that it contain no more than 0.20%. Use of any material possessing this amount of acid for polyester resin production requires the addition of the neutralizing agents discussed above, and would require this addition even if considerably less residual acid remained. For example, 20 parts per million when present in the polymerization reaction has caused premature gelation in at least one instance.

The analytical method utilized in determining the residual sulfuric acid content of tetrabromophthalic anhydride is very sensitive. It is a gravimetric method involving the precipitation of barium sulfate. Barium sulfate is extremely insoluble, having a solubility of about 0.0049 mg. per 500 ml.—see "Quantitative Chemical Analysis," 10th ed., Hamilton & Simpson, The MacMillan Company, New York, N.Y., pages 326 et seq. Thus it is possible to detect the presence of very small quantities of this residual acid and to determine accurately the quantity of any acid which is present even in very small amounts.

The purifying procedure of the present invention unexpectedly makes it not only possible but commercially feasible to treat tetrabromophthalic anhydride to produce a product free from residual acid (as $H_2SO_4$); and therefore one suited for use in producing fire retardant or self-extinguishing polyesters without the use of neutralizing agents added to the "cook." The procedure is uncomplicated and is practical. Tetrabromophthalic anhydride containing residual acid is slurried with 1,4-dioxane, is filtered and washed with water to remove the dioxane. The water washing may be repeated, once or more than once, as desired. The washed product is then dried in an oven. Analysis of the product reveals that there was no detectable $H_2SO_4$, according to the analytical method referred to hereinbefore. Although 100% dioxane is preferred as the treating agent, an appropriate solvent or carrier may be used with the dioxane if desired. However in this case at least 25% by weight of the mixture or solution should be dioxane. It should be especially noted that this treatment of the technical grade tetrabromophthalic anhydride is a washing treatment. The crystals of the tetrabromophthalic anhydride do not dissolve. Also, suitable washing means other than utilizing a slurry may be employed to effect the washing operation.

It is not fully understood why dioxane produces the desired result when the various recrystallizing and washing treatments referred to in part above were unsuccessful. It is believed that sulfuric acid may be regarded as a sulfonium compound ($H^+ + HSO_4^-$) which is attracted to the dioxane

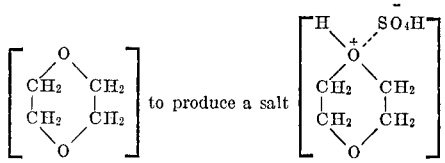

It is surprising that the dioxane has such a strong attraction for the $H_2SO_4$, particularly since the acid appears to be occluded and therefore is notoriously difficult to remove. It is also particularly advantageous that both the dioxane and the salt formed with it are water soluble. Thus, it is a simple matter to wash these materials out when the washing with dioxane has been completed. Removal of the water from the treated tetrabromophthalic anhydride sometimes creates a problem. But in this case the drying operation can be extended relatively easily, or if necessary, a second drying operation can be utilized.

The procedure of the present invention is further illustrated in the following specific examples:

EXAMPLE I 300 ml. of p-dioxane are placed in a 500 ml. flask equipped with a stirrer. 200 gm. of tetrabromophthalic anhydride containing 0.423% by weight of $H_2SO_4$ were then placed in the flask and agitated with the p-dioxane for 30 minutes. The washing operation was then discontinued and the tetrabromophthalic anhydride filtered from the dioxane using a funnel containing a fritted glass disc (coarse). The product was then placed in an oven and dried at about 110° C. until constant weight. Instead of using a flask and stirrer, a beaker could be utilized and agitation effected with a magnetic stirrer, or the like.

EXAMPLE II

A 5 liter flask equipped with an agitator was charged with 3 liters of p-dioxane. 2,100 gm. of tetrabromophthalic anhydride containing 0.198% of residual sulfuric acid were agitated in the flask for 45 minutes. The tetrabromophthalic anhydride was then filtered from the dioxane utilizing a Buchner funnel (large) having a #40 filter paper. The filtered material was then washed four times with water using 1 liter for each washing operation. It was then dried in an oven at about 110° C. until constant weight.

What is claimed is:

1. A method of purifying tetrabromophthalic anhydride containing as an impurity a relatively small amount of sulfuric acid, which comprises washing said anhydride with dioxane, and thereafter washing the treated material with water.

2. A method according to claim 1 in which the treated and washed material is dried.

3. A process for removing substantially all residual sulfuric acid from tetrabromophthalic anhydride produced in a sulfuric acid medium, which comprises washing said anhydride with dioxane, separating the washed anhydride from the dioxane, washing said anhydride with water, and thereafter drying it.

4. A process according to claim 3 in which the drying is conducted at an elevated temperature.

5. A process according to claim 3 in which the washing with dioxane is accomplished by forming a slurry with the sulfuric acid-containing anhydride and agitating it.

6. A process according to claim 3 in which the washing with dioxane is accomplished by forming a slurry with the sulfuric acid-containing anhydride and agitating it, and in which the drying is accomplished in an oven at at least 110° C.

References Cited
UNITED STATES PATENTS 3,007,943    11/1961    Hoffman _____ 260—346.3

ALEX MAZEL, Primary Examiner

B. I. DENTZ, Assistant Examiner